United States Patent [19]

Ovshinsky et al.

[11] Patent Number: 4,544,473

[45] Date of Patent: Oct. 1, 1985

[54] CATALYTIC ELECTROLYTIC ELECTRODE

[75] Inventors: Stanford R. Ovshinsky, Bloomfield Hills; Krishna Sapru, Troy, both of Mich.

[73] Assignee: Energy Conversion Devices, Inc., Troy, Mich.

[21] Appl. No.: 148,915

[22] Filed: May 12, 1980

[51] Int. Cl.$^4$ .............................................. C25B 11/04
[52] U.S. Cl. ................................... 204/292; 204/293; 502/101; 502/204; 502/206; 502/308; 502/311; 502/313; 502/320; 502/322; 502/323; 502/327; 502/335; 502/351; 502/354
[58] Field of Search ......................... 252/425.3, 477 Q; 204/293, 292, 2.1; 502/101, 204, 206, 308, 311, 313, 320, 322, 323, 327, 335, 351; 502/354

[56] References Cited

U.S. PATENT DOCUMENTS

| | | |
|---|---|---|
| 3,428,490 | 2/1969 | Bravo et al. ................... 252/477 Q |
| 3,673,116 | 6/1972 | Richter ...................... 252/477 Q X |
| 3,926,844 | 12/1975 | Benczur-Urmosy ................ 252/432 |
| 4,033,837 | 7/1977 | Kuo et al. ............................ 204/98 |
| 4,080,278 | 3/1978 | Ravier et al. ....................... 204/242 |
| 4,105,531 | 8/1978 | Kuo et al. ....................... 204/290 R |
| 4,116,804 | 9/1978 | Needes ............................... 204/284 |
| 4,248,680 | 2/1981 | Carlin et al. .......................... 204/98 |
| 4,279,709 | 7/1981 | McIntyre et al. ..................... 204/98 |
| 4,323,595 | 4/1982 | Welch et al. ........................ 427/123 |

OTHER PUBLICATIONS

Hackh's Chemical Dictionary by Grant, p. 34, Published by Blakiston, Co., Philadelphia (1944).

*Primary Examiner*—John F. Niebling
*Attorney, Agent, or Firm*—Lawrence G. Norris; Timothy H. Gens; Richard M. Goldman

[57] ABSTRACT

A catalytic body which is substantially amorphous is formed from at least two materials vacuum deposited on a cool substrate or sprayed on a cool surface to provide a local order non-equilibrium structural configuration. The amorphous body comprises a composition of at least one metal and a second component which maintains the amorphous character of the composition. The body has an increased number and desired type of catalytically active sites. In most applications, the composition includes at least initially a component which is removed by leaching or vaporization to leave a rough surface with a large surface to volume ratio. The resulting composition is sometimes annealed to relax or modify the local structure thereof to provide a more reactive structural configuration. In an electrode form of the invention, the catalytic body is highly conductive, resistant to corrosion and degradation under current reversal and has low overvoltage characteristics when used in electrochemical cells.

11 Claims, 3 Drawing Figures

TABLE 1

| COMPOSITION BEFORE LEACHING | ELECTROLYTE (°C) | ELECTRODE TREATMENT | TAFEL SLOPE (mV/DECODE) | OVER VOLTAGE (mV) AT KA/m² | | |
|---|---|---|---|---|---|---|
| | | | | 2 KA/m² | 5 KA/m² | 10 KA/m² |
| $Mo_{40}Ni_{40}Al_{20}$ | 17% NaOH, 86°C | A, b. | 34 | 75 | 90 | 105 |
| $Mo_{40}Ni_{40}Al_{20}$ | 28% KOH, 86°C | A, b. | 40 | 97 | 105 | 130 |
| $Mo_{40}Ni_{40}Al_{20}$ | 17% NaOH, 85°C | c. | 37 | 73 | 92 | — |
| $Mo_{20}(Ni_{.3}B)_{60}Al_{20}$ | 17% NaOH, 85°C | A, b. | 38 | 70 | 85 | 100 |
| $Mo_{30}Ni_{40}B_{10}Al_{20}$ | 17% NaOH, 86°C | D, b. | 40 | 67 | 85 | 105 |
| $Mo_{40}Ni_{40}Zn_{20}$ | 28% KOH, 90°C | A, b. | 37 | 73 | 100 | 120 |
| $V_{40}Ni_{40}Al_{20}$ | 17% NaOH, 90°C | A, b. | 43 | 90 | 105 | — |
| $Ti_{10}Ni_{70}Al_{20}$ | 17% NaOH, 80°C | D, b. | 50 | 85 | 110 | 125 |
| $Ti_{20}Ni_{60}Al_{20}$ | 17% NaOH, 88°C | D, E. | 46 | 92 | 115 | 160 |
| $Ti_{40}Ni_{40}Al_{20}$ | 17% NaOH, 87°C | A | 52 | 65 | 95 | 140 |
| $Ti_{20}Ni_{60}Al_{20}$ | 17% NaOH, 90°C | A, b. | 40 | 125 | 170 | — |

A  LEACHED IN NaOH (25%) AT 85°C, 4 HR.
b  AFTER LEACHING A, HEATED IN AIR, 360°C, ½ HR., 1 ATM.
C  LEACHED IN NaOH (17%) 80°C, 1 HR., THEN ROOM TEMPERATURE OVERNIGHT.
D  LEACHED IN NaOH (17%) 85°C, 1 HR.
E  LEACHED, THEN ANNEALED IN AIR, 32°C, 2 HR.

fig. 3

CATALYTIC ELECTROLYTIC ELECTRODE

BACKGROUND OF THE INVENTION

This invention relates generally to catalytic bodies, and has an especially important use in electrodes for electrochemical processes, water electrolysis and fuel cells, and catalysts for chemical processes. These electrodes possess a greatly enhanced catalytically active surface with the number and type of catalytic sites desired, due to the unique electronic and compositional states and structural configurations attainable with the amorphous materials fabricated through the process aspects of this invention. The electrodes or bodies of this invention may be formed of, or coated with, the catalytically active material of the invention. These amorphous electrode materials can be provided with a high surface to volume ratio, which further enhances electro-catalytic activity.

Some of the problems of the prior art electrodes are overvoltage and stability. Overvoltage is a source of resistance to current passage at the surface of the catalytic body. Among other factors, overvoltage is also affected by the composition, the structural configuration and the nature of the surface of the catalytic body. For each application there is a characteristic overvoltage determined by a combination of the above properties plus the dischargeing ion, electrolyte, current density, etc.

The overvoltage is also related to the number and nature of the active sites on the catalytic body which in large part determine the saturation current density of the reaction. An insufficient number of the desired type of sites restricts the rate of the desired reaction and hence the formation rate of the desired products.

As one application example, in the chlor-alkali electrochemical cell process a sodium chloride solution is electrolyzed to give chlorine gas at the anode, and hydrogen gas and a solution of sodium hydroxide at the cathode. Conventional cathodes, such as steel and the like, in such cells exhibit an overvoltage for hydrogen of approximately 300–500 mv at a current density of 2 $KA/M^2$. This overvoltage loss results in decreased efficiency in the generation of the products and high power consumption. Due to the present energy crisis, the evolved hydrogen is becoming of significant commercial importance as a fuel, while previously it was usually vented to the atmosphere.

Using conventional electrodes, about 10% of the electrical energy used in the cells is consumed by cathode overvoltage. Hence, even a small reduction in the overvoltage will result in a meaningful energy savings. Similar overvoltage losses are present in all electrochemical processes, and similar savings are possible using the electrodes of the present invention.

The second problem encountered in the prior art was that of electrode instability. Many of the materials used are degraded by the action of the environment to which they are subjected; still others are sensitive to atmospheric oxygen, and thus must be handled with great care to prevent degradation. Another instability problem is present when a reverse current pulse is applied to the electrode. The reverse current pulse causes reverse polarization of the electrode body, which in turn causes a significant decrease in the reaction efficiency. Such current reversals are not uncommon in industrial application caused by leakage currents during startups, shutdowns and power failure. Therefore, the ability to withstand such polarization reversals is quite important.

Considerable effort has been directed toward overcoming the problems of overvoltage and stability. The problems of some applications can be partially overcome by utilizing electrodes made of or coated with compositions of noble metals such as platinum, palladium, ruthenium and the like. While these materials may improve overvoltage values, they suffer from problems of very high cost and scarcity of materials and difficulty in manufacturing procedures. Also, some of these aforementioned electrode materials are quite susceptible to degradation of performance by atmospheric contamination, or "poisoning" by certain components of the reaction mixture. In spite of these problems they have found some utility since they are heretofore the only materials suitable for certain applications, for example as electrodes for high temperature fuel cells.

Prior to the present invention, attempts to eliminate the use of noble metals have not proven wholly successful. For example, electrodes made of steel and the like, have been coated by electroplating the same with various materials providing crystalline coatings thereon. While such electrodes provided somewhat reduced hydrogen overvoltages when operated in a chlor-alkali cell, they were subject to corrosion and degradation when reverse polarized. U.S. Pat. Nos. 4,033,837 and 4,105,531 disclose electroplating an alloy of nickel (80–20%), molybdenum (10–20%) and vanadium (0.2–1.5%) on a conductive electrode to provide a material for use as a chlor-alkali cathode. This material had a somewhat lower overvoltage than uncoated steel, but suffered from degradation when subjected to reverse polarization.

U.S. Pat. No. 4,080,278 discloses electrodes coated with a compound of the general formula $A_xB_yO_z$ where A is an alkali or lanthanide metal, B is chosen from the group: Ti, W, Mo, Mn, Co, V, Nb, Ta; O is oxygen. The compound is mixed with a binder metal and coated on an electrode base by techniques that include plasma and flame spraying of powdered material, vacuum evaporation, sputtering, and explosive bonding. In some cases, the techniques of the aforementioned patent may result in amorphous coatings, however it is not an object of the invention to prepare amorphous coatings, and, in fact, it appears to be the intention of the inventors to return the amorphous coating to a crystalline condition, since the latter patent refers to heating the amorphous films to return them to their crystalline state. Furthermore, no desirable properties or examples of the article thus formed are ascribed to amorphicity or vacuum deposition.

Other approaches involve materials of the "Raney" metal type, wherein deposition of a multicomponent mixture, followed by the selective removal of one of the components yields a high surface area material, with improved electro-catalytic properties. One such process is disclosed in U.S. Pat. No. 4,116,804. The process disclosed involves plating and flame spraying layers of nickel and aluminum respectively on an electrode substrate, followed by a step of heating the layers to cause interdiffusion of the metals. The interdiffused aluminum is then leached to give a high surface to volume area nickel coating. While the electrodes of this invention exhibit somewhat lowered overvoltages for electrochemical reactions, the process is quite energy intensive, and the article thus produced is quite susceptible to environmental degradation and consequently must be protected from contact with air.

Still another process is disclosed in U.S. Pat. No. 3,926,844. This process involves the deposition of amorphous borides of nickel, cobalt or iron by the reduction of their salts in an aqueous bath. While the materials thus prepared are amorphous, and do exhibit some electrocatalytic activity, the method is of limited utility. The range of compositions that can be prepared by this method is quite limited because of the compositional restrictions imposed by the process conditions involved. While low overvoltage is discussed, it does not appear that the overvoltage is in the range of the low overvoltage of the present invention and the only operating examples given are for a temperature of 20° C. which is well below general industry operating temperatures which are in the range of 80°–90° C.

While the above prior art patents discuss improvements over various electrodes including mild steel electrodes, mild steel electrodes have high overvoltage but still remain the industry standard for the chlor-alkali industry and for hydrogen evolution in general. The prior art crystalline structures have crystalline planes and microcrystalline boundaries and dislocations, each of which increase the corrosiveness of the structures since corrosive attacks on the structure are initiated in such locations. Therefore, it appears that the prior art attempts to improve electrode performance over the mild steel electrode have not been successful, since the prior art electrodes have not been accepted to any significant degree.

One object of this invention is to provide a catalytic body and method of making the same which overcome any one and preferably all of the disadvantages of the prior art. Another object of the invention is to provide an electrode material and method of making the same where the electrode material exhibits high elecrocatalytic activity as is manifested in low overvoltage values, and also has a high degree of stability under a wide range of operating conditions including polarity reversal. It is a further object of this invention that the methods of making said electrode or catalytic body be simple and inexpensive to carry out.

SUMMARY OF THE INVENTION

The amorphous materials of this invention can be prepared in a wide range of compositions in desired structural configurations so as to exhibit the optimum catalytic activity for a given process condition. Catalytic activity is a selective interaction of the appropriate electronic configurations of the catalyst with the reacting species, resulting in a state which serves to steer a reaction down a desired path. Catalysis is a surface phenomenon. The invention includes designing and forming amorphous material bodies which exhibit catalytic properties throughout the bulk of such bodies. In other words, deviant electronic configurations, such as dangling bonds, microvoids, and other irregularities found in small numbers on the surface of crystalline materials, can be designed to occur in greater numbers throughout the bulk of the amorphous body each of which can be catalytic active sites. One method of increasing the number of active sites in an amorphous body is by leaching or evaporating a material dispersed throughout a multi-component amorphous body. Amorphous material bodies can be made to behave like an almost infinite surface when made in the manner of the present invention to be described. Thus, when atoms are removed from an amorphous material by leaching or vaporization, a variety of types of exposed surface sites result, a large number of which are desired active types, unlike the similar treatment of crystalline materials when the exposed surface area is much less variable and thus less likely to produce the desirable, more catalytically active surface area sites. Removal of atoms during leaching or vaporization from the amorphous body not only leaves behind voids but creates active sites not obtainable by forming the body without the atoms which are then removed. Further, these sites can then be modified by adding other atoms near those sites which will then form different types of catalytic bodies.

In accordance with a further feature of the invention, the amorphous catalytic material bodies of the invention are preferably treated by heating to a temperature which does not crystallize the materials but which allows for a structural relaxation and reconstruction of the amorphous body which also enhances catalytic activity and reduces overvoltage in electrode applications of the invention at high current densities. These conformational changes can also result in the creation of modified density of electronic states, the better utilization of other states and/or a shift in the Fermi energy, resulting in further increases in catalytic activity.

The amorphous coating of the electrodes of the invention are preferably deposited by vacuum deposition (i.e., sputtering, vapor deposition, or plasma deposition) for ease and economy of preparation and also to enable the preparation of any desired compositional range of materials. In contrast, as previously mentioned, electroplating and certain other deposition methods are limited to the use of only certain materials and compositions. Furthermore, it is possible to attain electronic states in amorphous materials which are unique, since the constraints of crystalline symmetry and stoichiometry are not present therein. Additionally, the amorphous state of such materials also tends to confer increased corrosion resistance to a given body because of the absence of crystalline planes and microcrystalline boundaries and dislocations, which are locations for the initiation of corrosive attack.

The character of an amorphous film deposited by electroplating or similar process is substantially different from the unusual structure compositions of the amorphous catalytic bodies of the invention. Because of the inherent limitations in the technique, the catalytic activity of electroplated films cannot be readily optimized or tailor made to meet specific reaction conditions which is so important for the various applications of the invention. In the present invention, the use of vacuum deposition, especially co-sputtering or spraying where the individual components making up the amorphous catalytic body involved are most preferably separately directed onto a relatively low temperature substrate surface at individually variable rates, produces a stable, substantially amorphous composition with almost any desired component ratio and with a wide variety of non-equilibrium structural configurations. Thus, an amorphous composition made in accordance with the invention can be made more catalytically active for the reaction involved. This is not readily possible with the prior art processes for making catalytic bodies, like the electroplating and other processes disclosed in U.S. Pat. No. 3,926,844.

In the case of an electrode for an electrochemical cell, the electrode of the invention may comprise a substrate, which may have a variety of configurations, and preferably made of a relatively inexpensive metal or non-metal material, and a conductive coating of a substantially amorphous multicomponent composition. In the case of the substrate, while a variety of non-metallic materials may be utilized, it is preferred that it be a conductive substrate such as steel, titanium, graphite, molybdenum, nickel, or copper. The substantially amorphous conductive coating comprises a multicomponent amorphous material alloy or composition of at least two different components, one of which may be a transition metal. Examples of transition, non-noble metals which may be used include vanadium, titanium, chromium, cobalt, nickel, niobium, molybdenum, and tungsten. The composition may also include two or more of the transition elements of this list and/or minor amounts of noble metals like platinum, ruthenium, and palladium. Additionally, elements other than transition elements may be added to the composition such as lithium, boron, carbon, nitrogen, oxygen, aluminum and silicon. These additional transition or other elements are for the purpose of maintaining the substantially amorphous character of the catalytic body and to provide optimum reactive, non-equilibrium structural configurations. The exact number, character and percentages of the components making up the conductive coating depends upon the particular application of the electrode or other catalytic body involved.

In one preferred form of the invention, as previously described, the substantially amorphous conductive coating initially includes leachable components, like aluminum, lithium or zinc, which are subsequently leached out to leave a film of high surface to volume area. Additionally, it is highly desirable for some applications, especially after leaching, that the amorphous conductive coating is annealed. The annealing operation can take place in an evacuated environment or under ambient conditions. The preferred amorphous compositions of the invention described are particularly advantageous in that they can be conveniently annealed in an ambient environment. Some prior art materials require heating in an evacuated or an inert environment, which is less desirable. As previously explained, instead of leaching out one of the additional components referred to, these components also can be removed by methods other than leaching, such as by vaporizing the same, where the vaporizing condition will not degrade the amorphous mixture involved. Also, after removing a component by leaching or vaporizing, a different component can be added to the body which will react with the exposed sites to give unusual structural configurations not otherwise obtainable.

The present invention is also applicable to electrodes and other catalytic bodies where the entire body comprises the catalytically active matrix.

DESCRIPTION OF DRAWINGS

FIG. 3 is a table illustrating the overvoltage characteristics and Tafel slopes for the various catalytic body embodiments indicated therein.

DESCRIPTION OF EXEMPLARY EMBODIMENTS OF THE INVENTION

In the form of the invention having its greatest utility in forming catalytic bodies for electrochemical applications, the most highly catalytically active body is obtained by a multi-step process. As will be described in detail hereinafter, in the first step of the process, at least a two-element substantially amorphous alloy or composition is formed, preferably by vapor deposition techniques, upon a preferably sandblasted metal substrate. As previously indicated, the alloy or composition includes at least one metal and at least one, and preferably at least two other, metals or elements. For example, the amorphous structural composition for an electrode or electrode coating to be used in a typical electrolysis cell used to generate a gas, such as oxygen or hydrogen, may include nickel and another material, like molybdenum or titanium, to which is added a leachable material, like aluminum or zinc. The leachable or vaporizable material is then removed. The resulting body then can be heat treated, as by annealing, or a different material can be added to react with the sites from which the leachable or vaporizable material was removed.

Figure 1:
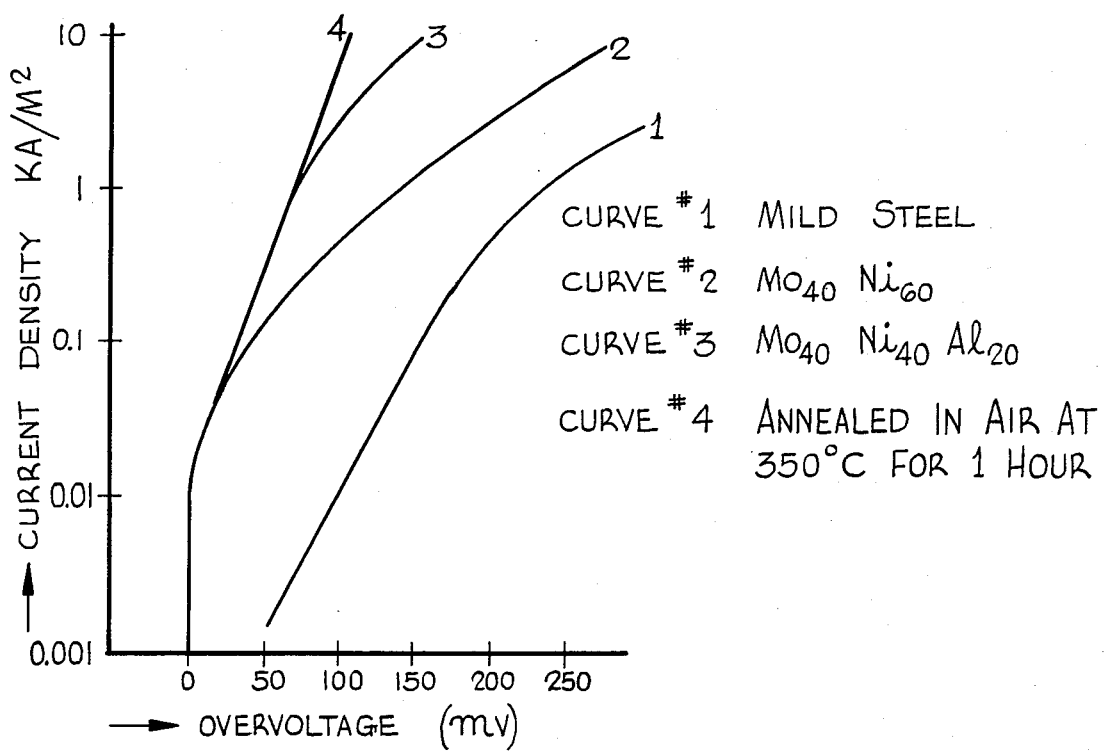
FIG. 1 illustrates a typical current voltage curve of a conventional sandblasted mild steel hydrogen electrode compared with various catalytic body embodiments of the invention.

Referring to FIG. 1, the current density characteristics versus the overvoltage values for a conventional industry utilized mild steel electrode is illustrated by Curve No. 1. As mentioned above, although the various prior art electrodes are claimed to be significantly improved over mild steel electrodes, the great majority of industry still utilizes mild steel electrodes for hydrogen evolution indicating that the prior art electrodes do not have sufficiently improved performance over the basic mild steel electrodes. The mild steel electrode illustrated in FIG. 1 has been well cleaned by sandblasting to provide the best performance for it. It still shows an effective saturation current density of about 2 KA/$M^2$.

Curve No. 2 illustrates the performance of an amorphous vacuum deposited electrode having a composition of $Mo_{40}Ni_{60}$. The improvement in performance over the mild steel electrode is shown by the decrease in overvoltage for the same current densities. Also, the saturation current density is increased indicating the increase in the number and desired type of catalytically active sites.

Curve No. 2 illustrates the performance of a leached amorphous vacuum deposited electrode having a deposited composition of $Mo_{40}Ni_{40}Al_{20}$. The further increase in the desired number of catalytically active sites is shown by the improved performance in the current voltage characteristics. The increase in the number of catalytic active sites in part results from the increase in the surface to volume ratio obtained by the removal of a substantial amount of aluminum from the electrode body.

Curve No. 4 illustrates the improvement of the current voltage characteristics obtained for hydrogen evolution at high current densities by annealing the electrode of Curve No. 3. Some industry applications and present hydrogen evolution applications typically operate at current densities between 1.5 and 3 KA/$M^2$. This limitation is in part imposed by the effective current density saturation of the mild steel electrodes presently used. For increased production rates or for uses where a separator such as a diaphram, is attached to the electrode by heating to temperatures of about 350° C., prior electrodes other than steel typically degrade during the heat treatment. The electode of Curve No. 4 which was heat treated at 350° C. does not show any indication of current density saturation even at 10 KA/M² which is highly desirable for increased production rates. The increased rates allow a decrease in capital investment, because a fewer number of cells now can produce the same amount of product.

Figure 2:
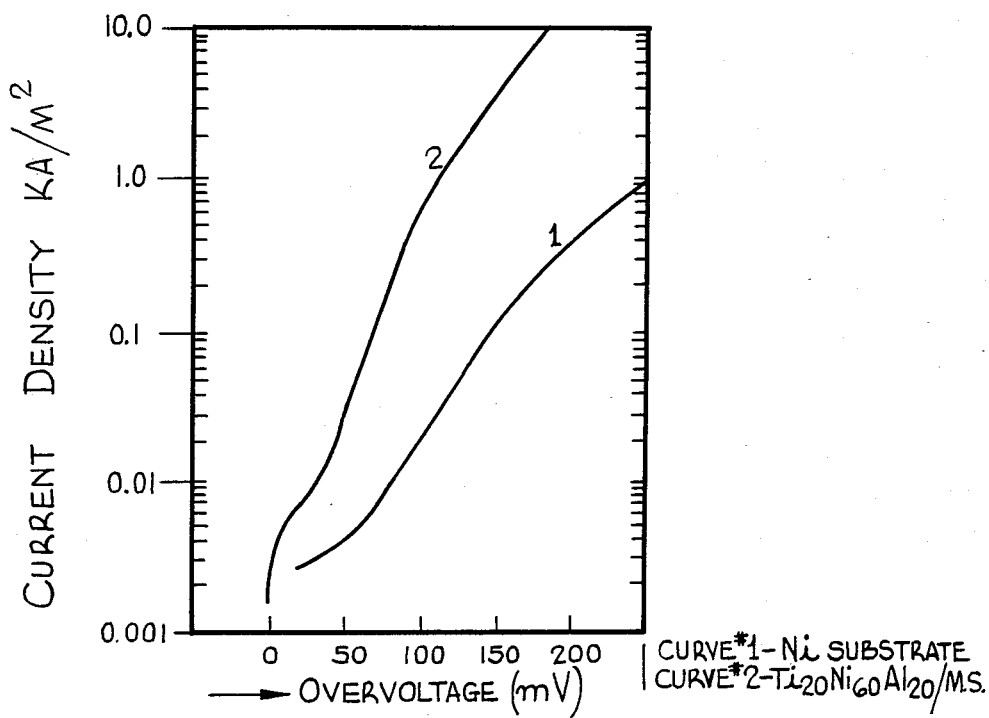
FIG. 2 illustrates a typical current voltage curve for a sandblasted nickel electrode for oxygen evolution compared with one catalytic body embodiment of the invention.

Referring to FIG. 2, the current density characteristics versus the overvoltage values for a clean and sandblasted nickel electrode for oxygen evolution is illustrated by Curve No. 1. A significant decrease in the overvoltage value for current densities is obtained by an amorphous vacuum deposited oxygen electrode body having a deposited composition of $Ti_{20}Ni_{60}Al_{20}$. The body was then leached and heat treated. For example, at a current density of 1 KA/M², the decrease in overvoltage from the nickel electrode is from about 255 mV to 110 mV.

The Table of FIG. 3 illustrates several specific examples of catalytic body compositions and treatments and their respective current voltage performance. Examples 1 through 10 of the Table are described with respect to hydrogen evolution and example 11 is described with respect to oxygen evolution. The measurement of the overvoltages shown in FIG. 3 was made by using a glass cell having a membrane which separates the anode compartment from the cathode compartment. For the cathode, a known area of the co-sputtered cathode was used in contact with the electrolyte. The cathode and the anode were connected electrically using a controllable voltage source. A Luggin capillary in the cathode chamber was connected to a saturated calomel reference electrode which in turn was connected to the test electrode by a voltmeter. In order to determine the overvoltage of the cathode, a voltage was applied through the voltage source between the anode and the test cathode such that current densities of up to 10 KA/M² were obtained. The current density was not limited by saturation of the bodies, but by the test facility utilized. Overvoltage was calculated using the Tafel equation:

$$\eta = \beta \log I/I_o$$

where $\eta$=overvoltage (mV), $\beta$=slope of the Tafel curve in mv/decade of current, $I_o$=exchange current density, i.e., current at zero overvoltage, and I=- measured current density.

While the process conditions for depositing the amorphous compositions selected may vary widely, the following describes one exemplary deposition process. First, when the catalytic body is to include a substrate on which is coated the materials described, the substrate is preferably treated by sandblasting, which increases adhesion of the coating to the substrate. Sandblasting can be done with various grit sizes and with various pressures or with varying force.

Next, the films or coating of the active material may be formed by co-sputtering in a conventional r.f. sputtering system, such as one made by the Veeco Company. Here, a target is bonded to a plate made of one of the materials to be deposited. The other desired composition and leachant materials are secured to the target in desired amounts. Alternatively, separate targets made of or having the materials thereon may be used simultaneously. The substrates, which may be in the form of a metal mesh, expanded metal, sheet metal or wires are placed on a holder spaced from the target or targets by a distance determined by the deposition parameters. The desired composition and structure of the materials can be conveniently controlled by adjusting the deposition parameters.

The sputtering machine is first evacuated to a vacuum pressure of about $1 \times 10^{-6}$ Torr to provide a background vacuum pressure. Argon is bled into the machine to provide an operating pressure of about $4 \times 10^{-3}$ Torr to $5 \times 10^{-3}$ Torr is determined by a reading on a Pirani vacuum gauge. The material surfaces of the substrate target or targets are then cleaned by presputtering for a short period of time. Thereafter, the materials are co-sputtered onto the substrate or substrates for the time necessary to obtain the desired thickness, typically about 1000Å to 2 microns. The substrate temperatures during the sputtering operation are maintained low enough to assure an amorphous deposit.

Following the deposition of the amorphous materials, the catalytic body then can be leached if desired for a particular application. Following removal of an element the active sites exposed by leaching or vaporizing may have other elements added or incorporated to form different structural configurations and orientations. These new structural configurations are not the same as those which would be obtained if the added elements initially were co-deposited.

For certain applications, the removal of an element is followed by heat treatment, such as annealing. The heat treatment may be done in any desired environment to selectively obtain the desired type of catalytically active sites.

Alternatively, the catalytic amorphous bodies can be formed by spraying a separate stream of each material at controlled rates to combine on a cool surface in the desired configuration. The bulk material thus formed can be removed from the surface and leached, vaporized and/or heat treated as above described.

The catalytic body compositions and structure of the invention may be used as electrodes for the manufacture of $H_2$, $Cl_2$, NaOH, oxygen and chlorates, etc., or as electrodes in fuel cells or for other purposes where mechanically stable, corrosion resistant, and/or high conductivity catalytic materials are desirable. The catalytic bodies are useable as catalysts in chemical processes other than as electrodes to obtain the advantages of the invention.

It should be understood that numerous modifications may be made in the various exemplary forms of the invention without deviating from the broader aspects thereof.

What is claimed is:

1. A catalytic body comprising a composition having at least two vacuum deposited components and at one of said components comprising a transition metal element, said catalytic composition being in a substantially amorphous state, said composition having a local order non-equilibrium structural configuration resulting in a number of at least one desired type of catalytically active site interspersed throughout the bulk of the composition.

2. The catalytic body of claim 1 wherein at least some of said catalytically active sites are the result of the selective removal of an initially randomly distributed component in said composition.

3. The catalytic body as defined in claim 1 wherein said composition has a porous, high surface area to volume ratio produced by leaching or evaporating a distributed component in the original composition.

4. The catalytic body as defined in claim 3 wherein said deposited composition is heat treated to relax and/or reconstruct the structural configuration of the originally deposited composition, to increase the catalytic activity thereof.

5. The catalytic body as defined in claim 1 forming a hydrogen electrode, and said substantially amorphous composition thereof is an annealed alloy including substantial percentages of each of at least two different metals.

6. The catalytic body as defined in claim 1 wherein said substantially amorphous composition consists of a substantially amorphous alloy including substantial percentages of each of at least two different transition metals.

7. The catalytic body as defined in claim 1 wherein the substantially amorphous composition is obtained by directing the components as separate streams toward a surface which is at a relatively cool temperature to assure the formation of said amorphous non-equilibrium structural configuration.

8. The catalytic body as defined in claim 1 wherein the substantially amorphous composition includes at least one of vanadium, ruthenium, platinum, palladium, aluminum or boron.

9. The catalytic body as defined in claim 1 wherein the amorphous composition of at least one of titanium, vanadium, chromium, cobalt, nickel, niobium, molybdenum, tantalum, tungsten, rhenium, or boron.

10. The catalytic body as defined in claim 1 wherein said substantially amorphous composition consists of at least nickel and a second transition metal.

11. The catalytic body of claim 1 wherein said substantially amorphous composition includes at least about thirty percent nickel.

* * * * *

UNITED STATES PATENT AND TRADEMARK OFFICE
CERTIFICATE OF CORRECTION

PATENT NO. : 4,544,473

DATED : October 1, 1985

INVENTOR(S) : Stanford R. Ovshinsky and Krishna Sapru

It is certified that error appears in the above-identified patent and that said Letters Patent is hereby corrected as shown below:

Column 1, line 29, delete "dischargeing" and insert --discharging--;

Column 6, line 68, delete "electode" and insert --electrode--;

Column 8, line 52, after "at" (second occurrence), insert --least--.

Signed and Sealed this

Thirty-first Day of December 1985

[SEAL]

Attest:

DONALD J. QUIGG

Attesting Officer

Commissioner of Patents and Trademarks